US007399513B2

(12) United States Patent
Pearson et al.

(10) Patent No.: US 7,399,513 B2
(45) Date of Patent: Jul. 15, 2008

(54) PAPER INCLUDING WATERMARKS AND/OR EMBOSSING

(75) Inventors: Nicholas G. Pearson, Ware (GB); Paul Howland, Andover (GB)

(73) Assignee: De La Rue International Limited, Basingstoke (GB)

( * ) Notice: Subject to any disclaimer, the term of this patent is extended or adjusted under 35 U.S.C. 154(b) by 57 days.

(21) Appl. No.: 10/496,686

(22) PCT Filed: Nov. 26, 2002

(86) PCT No.: PCT/GB02/05336

§ 371 (c)(1),
(2), (4) Date: Jun. 10, 2004

(87) PCT Pub. No.: WO03/046282

PCT Pub. Date: Jun. 5, 2003

(65) Prior Publication Data

US 2005/0163970 A1 Jul. 28, 2005

(30) Foreign Application Priority Data

Nov. 26, 2001 (GB) ................................ 0128280.5

(51) Int. Cl.

| | |
|---|---|
| ***B32B 3/02*** | (2006.01) |
| ***B32B 7/02*** | (2006.01) |
| ***B42D 15/00*** | (2006.01) |
| ***D21H 27/14*** | (2006.01) |

(52) U.S. Cl. ......................... 428/84; 428/169; 428/192; 428/212; 283/113; 162/110; 162/140

(58) Field of Classification Search .................. 428/81, 428/84, 156, 169, 182, 187, 192, 212; 283/72, 283/113, 117; 162/110, 140
See application file for complete search history.

(56) References Cited

U.S. PATENT DOCUMENTS

| | | | | |
|---|---|---|---|---|
| 1,281,951 | A * | 10/1918 | Harper | 162/134 |
| 1,506,144 | A * | 8/1924 | Weeks | 283/67 |
| 4,135,024 | A * | 1/1979 | Callahan et al. | 428/171 |
| 4,462,867 | A | 7/1984 | Fuller | |
| 4,504,357 | A | 3/1985 | Holbein et al. | |
| 4,506,915 | A | 3/1985 | Haghiri-Tehrani et al. | |
| 4,601,692 | A * | 7/1986 | Rausing et al. | 493/355 |
| 4,715,623 | A * | 12/1987 | Roule et al. | 283/91 |
| 4,943,093 | A | 7/1990 | Melling et al. | |
| 5,871,615 | A * | 2/1999 | Harris | 162/140 |
| 6,174,586 | B1 | 1/2001 | Peterson | |
| 6,296,281 | B1 * | 10/2001 | Stone | 283/93 |
| 6,368,455 | B1 * | 4/2002 | Missell et al. | 162/140 |

FOREIGN PATENT DOCUMENTS

GB 2270931 A * 3/1994

OTHER PUBLICATIONS

Webster's II New Riverside University Dictionary, 1984, p. 1304.*

* cited by examiner

*Primary Examiner*—Donald Loney
(74) *Attorney, Agent, or Firm*—Dykema Gossett PLLC

(57) ABSTRACT

The invention relates to improvements in paper, and in particular to the use of watermarks and/or embossings for strengthening paper sheets and documents made therefrom. The invention therefore provides a sheet of paper having at least three corners and three sides joined at said corners, wherein corner reinforcing watermarks are provided at each of said corners. Alternatively, or in addition, corner reinforcing embossings are provided at each of said corners.

10 Claims, 4 Drawing Sheets

FIG. 3 L & W STIFFNESS
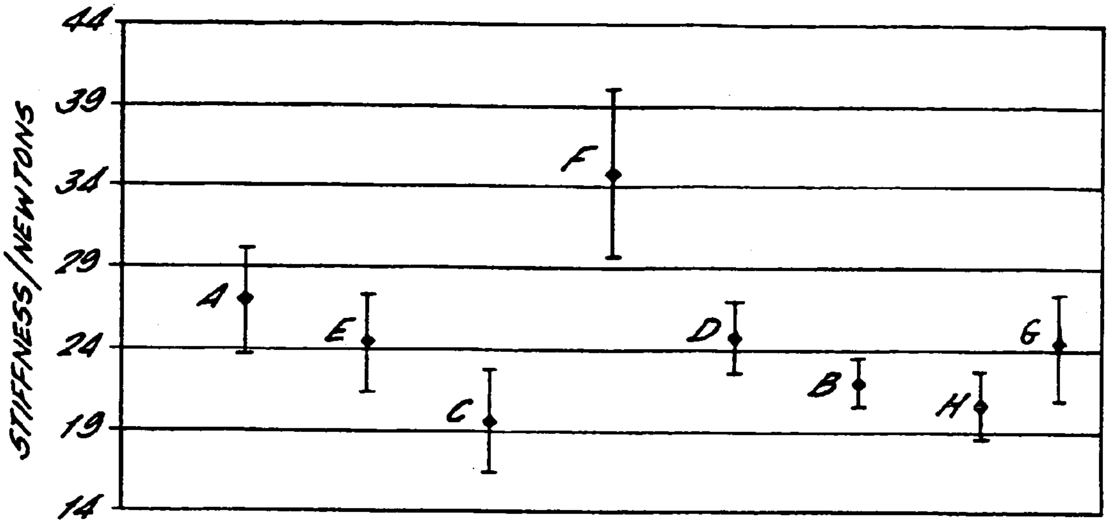
FIG. 4.
FOLD RECOVERY ANGLE - CONSTANT FORCE METHOD
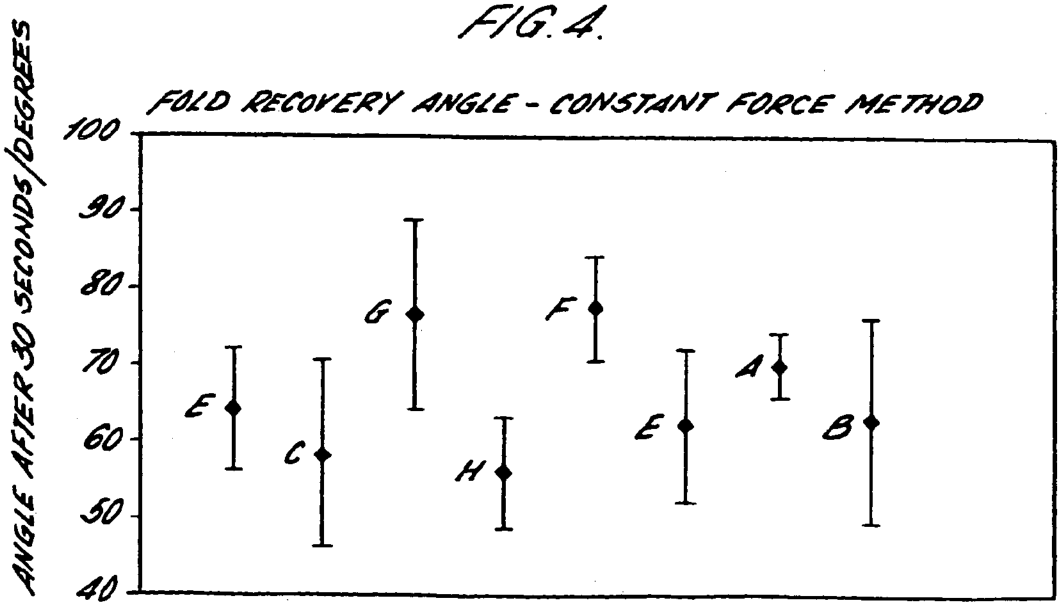

PAPER INCLUDING WATERMARKS AND/OR EMBOSSING

BACKGROUND OF THE INVENTION

1. Field of the Invention

The invention relates to improvements in paper, and in particular to the use of watermarks and/or embossings for strengthening paper sheets and documents made therefrom.

2. The Prior Art

Folded or bent corners (dog-ears) on banknotes present a significant problem for many banks, as they can cause problems in cash handling machines and can result in an artificially short note life. Many machines will reject such notes from circulation. One major European central bank has indicated that 80% of the rejections from their machines are due to such corner folds. Notes with folded corners can also be problematic in ATMs and cash dispensers and other note handling equipment. This is becoming a more significant problem as the use of such machines is becoming more and more widespread.

Efforts have been made to resolve this problem by providing note handling equipment with apparatus for flattening banknotes to enable a dog-eared or curled document to be fed without jamming. Such a system is described in U.S. Pat. No. 5,265,856.

Another problem which occurs with banknotes in particular results from the tendency of users to roll and fold notes for storage or keeping in wallets and purses. This gives rise to damage at the middle of the edges of the notes and similar problems arise in ATMs and other note handling equipment as occurs with dog-ears and corners.

It is therefore an object of the present invention to find a way of reducing the occurrences of corner folds and/or middle edge damage.

SUMMARY OF THE INVENTION

The invention therefore provides a sheet of paper having at least three corners and three sides joined at said corners, wherein corner reinforcing watermarks are provided at each of said corners.

The invention further provides a sheet of paper having at least three corners and three sides joined at said corners, wherein corner reinforcing embossings are provided at each of said corners, separately or in addition to the corner reinforcing watermarks.

The invention will now be described, by way of example only, with reference to the accompanying drawings.

BRIEF DESCRIPTION OF THE DRAWINGS

FIGS. 3, 4 and 5 show test results for various tests showing the improvement provided by the invention;

DETAILED DESCRIPTION OF THE PREFERRED EMBODIMENTS

Figure 1:
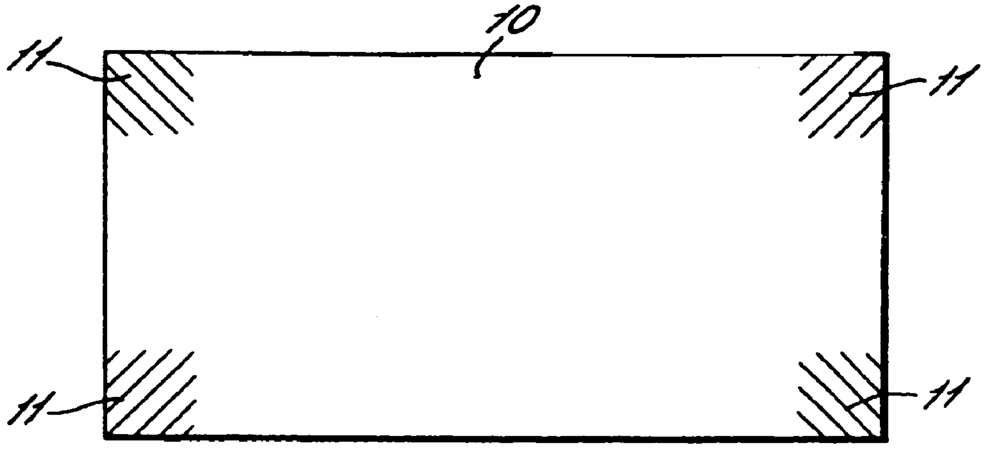
FIG. 1 is a representation of a small sheet of paper, such as a banknote, having corner reinforcing watermarks.

Referring to FIG. 1 there is illustrated a small sheet of paper 10, e.g. a banknote, made by hand or using a known papermaking machine, such as a cylinder mould or Fourdrinier machine. A range of fibre types can be used in the making of such paper, including synthetic or natural fibres or a mixture of both. The actual preparation of the fibres is unrestricted by the invention, and will depend on what effect it is wished to produce in the finished paper. For security paper used for security documents such as banknotes, passports, identification cards and so on, these need to be hard wearing, resilient and self-supporting and so an appropriate fibre mix must be selected.

According to a first aspect of the invention watermarks 11 are provided in each of the corners of the sheet 10 during the manufacture of the paper. A watermark is created by well known techniques of varying the grammage of paper fibres so that in some areas the fibres are of higher grammage than that of the base paper layer, and in others they are of lower grammage. When viewed in transmitted light the areas of lower grammage are lighter and the areas of higher grammage are darker than the base paper, and the contrast between the light and dark areas can be very clearly seen.

Watermarks have been widely used as security features, as true watermarks are very hard to counterfeit particularly by photocopying techniques. They are also used as aesthetic features, e.g. in stationery, as complex patterns can be produced by watermark techniques. Traditionally watermarks have always tended to be located in the main body of the sheet or document in which they are produced so that they can clearly be seen. In the present invention, on the other hand, the watermarks are specifically located in each of the corners of the sheet. This has resulted in the surprising increase in stiffness of the corners which leads to a significant and unexpected reduction in corner folds (dog-ears).

In particular, it has been found that watermarks that locally increase the grammage of the paper in the corner of the document significantly reduces its propensity to form dog-ears by increasing the stiffness in this area. One reason for this increase is because of the increase in the stiffness in the paper. It is well-known, according to classical beam theory, that the stiffness of an object is proportional to the cube of its thickness, as described in “Pulp and Paper Technology and Treatments of Paper”, 1978, page 74 by J d’A Clark, Freeman Publications Inc., San Francisco. Small increases in thickness do thus result in a disproportionately largely benefit in terms of stiffness. A typical stiffness measurement would be the L&W test as specified in ISO 2493.

Another particularly effective watermark pattern is one that results in lines of higher grammage areas approaching the edges of the paper at between 55° and 35° to the edge perpendicular, and more preferably at 45°.

Figure 2:
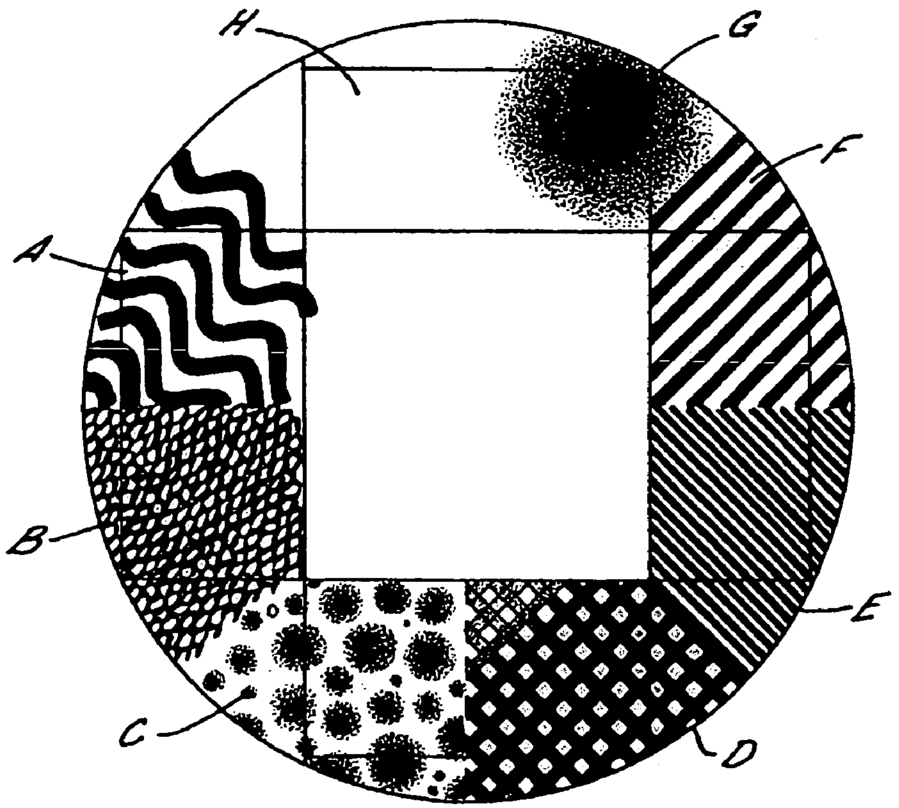
FIG. 2 shows different watermarks used for tests.

In tests carried out using handmade paper made using a specially prepared hand sheet mould, which was embossed with seven different patterns, it was found that corner reinforcing watermarks could increase the stiffness of the paper by over 50% in the corners. The patterns tested are shown in FIG. 2. These are marked for convenience as pattern A, B, C, D, E, F, G and a blank control as H. The L&W stiffness was measured at 45° to the machine direction and the results for each of the patterns as shown in FIG. 3.

FIG. 4 shows the results for a test developed for this study. The test gives an angle to which a fold relaxes after it has been bent over with a known force. In this case, whether other factors are constant, the watermark increases the fold recovery angle because of the stiffness imparted by the watermark pattern. The results of the specific patterns of FIG. 2 are shown in FIG. 4.

Figure 5:
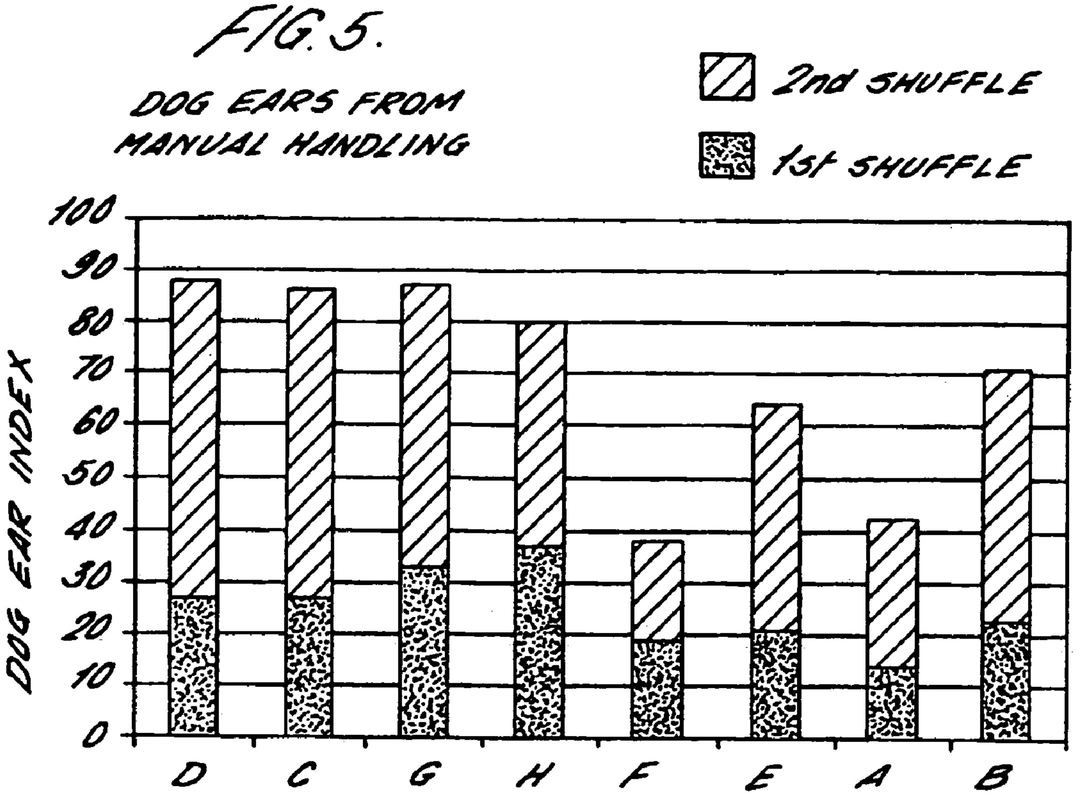

A further experiment was carried out to determine the probability of forming corner folds (dog-ears) and the results of this test are shown in FIG. 5. Again these results show the severity of the fold, shown as “dog-ear index” is least for the six-strip pattern F. It was found that the pattern F was the most effective. This was where the watermark comprised a thick stripe pattern with the stripes at substantially 45° to the machine direction (the edges of the sheet 10). The preferred thickness of the stripes used in the tests was in the range of 1 to 2 mm wide and most preferably 1.5 mm wide. The second most effective pattern was A which had wavy lines of 2 mm thickness.

The tests showed that the orientation of the elements making up the watermark design is important to give the optimum strength in the direction in which corner folds are likely to form, i.e. 45° to the machine direction.

It was found that the stiffness of the paper increased where the watermark was made from a positive pattern, having the effect of adding bulk to selected areas as compared to the thickness of the base paper layer, as opposed to a negative pattern where the main portion was thinner than that of the base paper layer.

Not only was the stiffness of the paper found to be increased in the paper made according to the invention, but in tests to measure fold recovery angle, it was found that the improvement in fold recovery was as much as 50% over paper without corner reinforcing watermarks.

Figure 6:
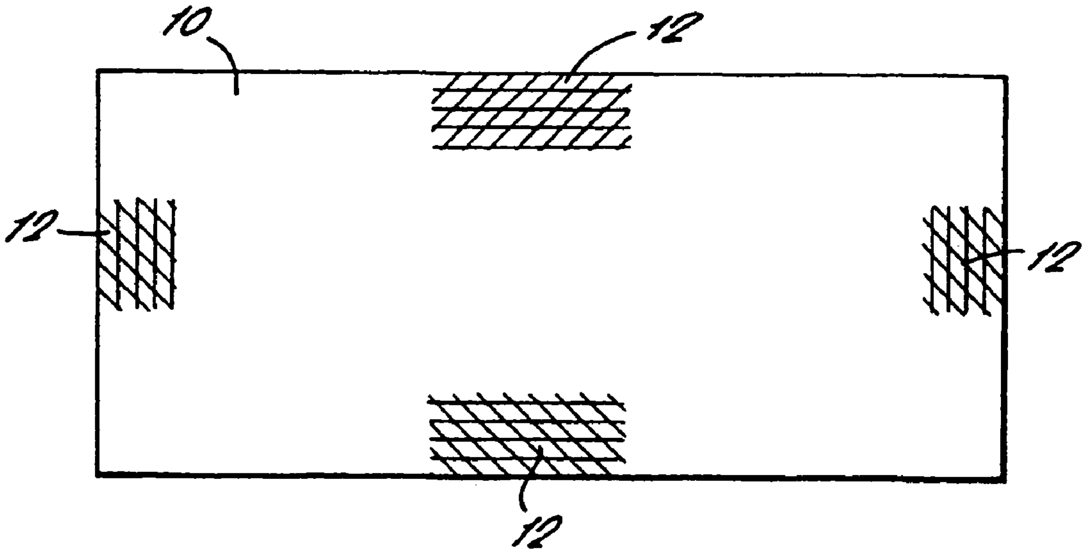
FIG. 6 is a representation of a small sheet of paper, such as a banknote, having edge reinforcing watermarks.

In a further embodiment of the present invention, watermarks 12 are created either at, or covering, the middle of each edge of the sheet 10, i.e. at North, South, East and West positions of the note when viewed face on. The problems identified previously relating to damage at the middle of each of the edges of banknotes have been found to be significantly reduced by providing such reinforcing watermarks at the middle of each edge, as shown in FIG. 6 because of the increased stiffness and improved fold recovery in these regions. Again, the watermarks 12 are preferably positive and the preferred form include corrugations and/or elements of the design perpendicular to the likely direction of folding or rolling, i.e. parallel to the edges of the sheet 10.

Notes which have both corner and centre edge reinforcing, for example a combination of the pattern shown in FIGS. 1 and 6 are preferred.

The individual reinforcing watermarks 11, 12 may be discrete, as illustrated in FIGS. 1 and 6, or they may be joined together so that the watermark appears as a continuous frame around the whole sheet 10. Alternatively, just some of the reinforcing watermarks 11, 12 may be joined, to provide an aesthetic pattern.

It should be noted that machine made paper is produced in a continuous webs, which is subsequently cut to form individual sheets. Obviously the pattern of reinforcing watermarks 11, 12 produced on the web will need to be carefully designed to ensure that when the sheet 10 are cut, the watermarks 11, 12 are located at the corners and/or edges of the sheet 10.

In a further embodiment of this invention it has been discovered that the effective thickness of the paper in the document corners can also be increased by embossing corrugations into the paper in patterns similar to those described above for watermark corner reinforcing. Embossing can preferably be achieved by the intaglio printing process commonly used for printing security documents.

It is well known that security documents in general, and banknotes in particular, can be embossed using the intaglio printing process. Embossing without the application of ink is sometimes used with a view to producing tactile security features as found on the Dutch 10 Guilder notes issues in 1997. These notes have a series of chevron patterns down the short edges of the notes. Testing carried out on these notes have shown that no improvement in corner fold stiffness was achieved by these embossings. The reason for this is that they are not positioned correctly to achieve such an effect being too far from the paper edge and the lines being too thin.

An extension of this idea, and a further embodiment of the above invention, is a document in which the watermark reinforced corners are also reinforced with intaglio embossed corrugations following a similar patter to the watermark reinforcing structure. When this combination of techniques was applied in tests to banknotes, corner stiffness increases of up to 250% were achieved, as measured by the L&W stiffness tester.

Alternatively the watermark reinforced corners are replaced by corner reinforcing embossings which may be produced by Intaglio printing, either with or without (blind) ink. The embossings preferably fill an area bounded by at least a length of 10 mm on each of the adjacent sides of each corner. More preferably the whole of each corner areas filled. The embossings preferably consist of a plurality of stripes, each having a width between 0.5 and 3 mm wide which are separated by gaps having a width lying in the range 0.5 to 3 mm. The stripes may be straight, wavy or curved and are preferably parallel.

The stripes of the embossings are preferably at an angle of between 70° and 111°, relative to the line of a corner fold set at 45° to one of the edges, and more preferably at an angle of 90°.

Figure 7:
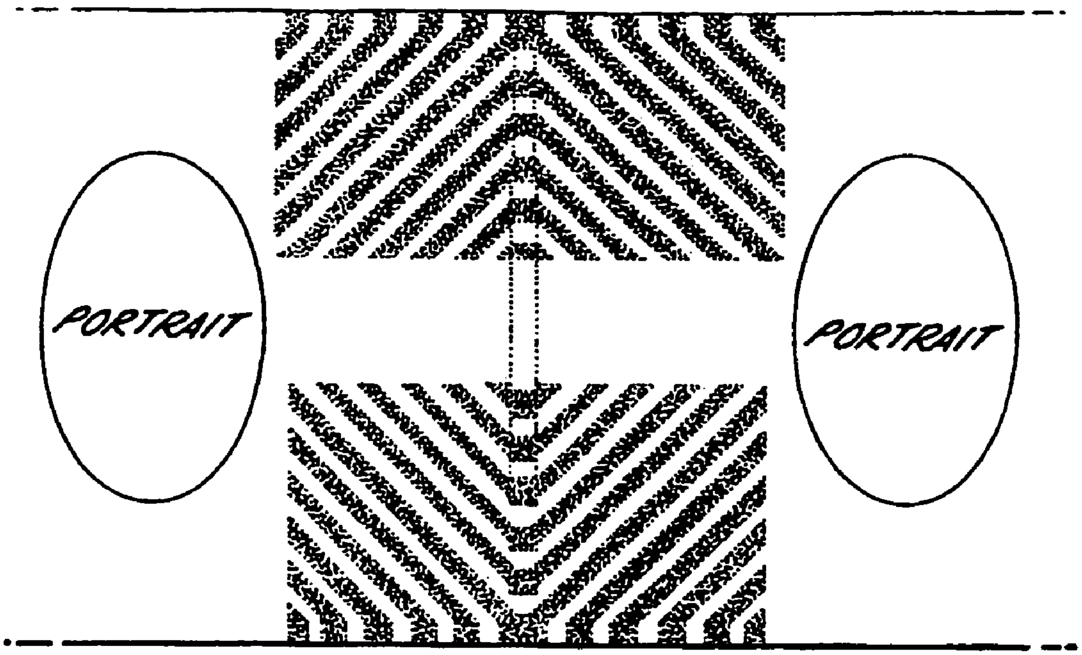
FIGS. 7 and 8 are representations of sections of cylinder mould covers used in the manufacture of a sheet of paper having corner reinforcing watermarks according to the invention.
Figure 8:
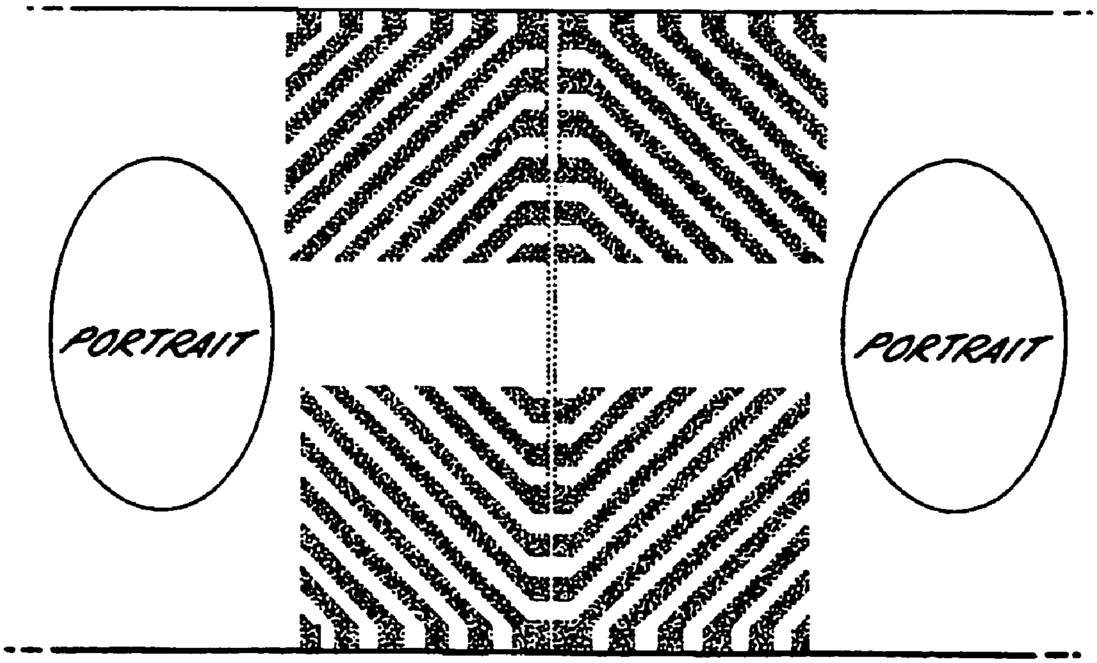

For paper used in documents where the reinforcing watermarks fall very close to other security features, such as a printed portrait, problems can occur due to the greater degree of shrinkage at the edge of the paper web than in the centre. To get a uniform finished document width, the actual document width on the cylinder mould cover during manufacture has to vary to compensate for shrinkage. One solution to this problem is to include small vertical and horizontal tails to the stripes of the embossings/watermarks which allow the die stamped areas of the mould cover to be overlapped or separated according to their position on the mould cover. FIG. 7 shows the die stamped areas overlapped and FIG. 8 shows the dies separated, allowing for maximum shrinkage of the edge of the mould. Without the horizontal and vertical tails and with the end of the diagonal stripes would obliterate each other in areas where overlapping is necessary.

The invention claimed is:

1. A sheet of security paper having at least three edges and at least three corners, said corners being formed where a pair of adjacent edges adjoin each other, said sheet having a mean paper grammage and a mean stiffness, and said sheet including reinforcing watermarks in each of said corners, wherein said reinforcing watermarks comprise a plurality of substantially parallel stripes, each of which stripes substantially extends at an angle between 35° and 55° from an edge of the sheet, said stripes having a paper grammage greater than said mean paper grammage and providing a stiffness in said corners greater than said mean paper stiffness to thereby increase the paper stiffness in a direction in which corner folds form.

2. A sheet of paper as claimed in claim 1 in which the reinforcing watermarks are positive watermarks.

3. A sheet of paper as claimed in claim 1 in which the stripes are straight.

4. A sheet of paper as claimed in claim 1 in which the stripes are undulating.

5. A sheet of paper as claimed in claim 1 in which the stripes of the corner reinforcing watermarks substantially extend at an angle of 45° to the edges of the sheet.

6. A sheet of paper as claimed in claim 1, in which the stripes have a width in a range of 1 to 2.5 mm.

7. A sheet of paper as claimed in claim 6 in which the width of the stripes lies in a range of 1.5 mm to 2 mm.

8. A sheet of paper as claimed in claim 1 having corner and edge reinforcing watermarks.

9. A sheet of paper as claimed in claim 8, in which the edge reinforcing watermarks comprise stripes which are substantially parallel to the edges of the sheet.

10. A sheet of paper as claimed in claim 1 in which the reinforcing watermarks are joined by watermark patterns.

* * * * *